Patented Jan. 17, 1933

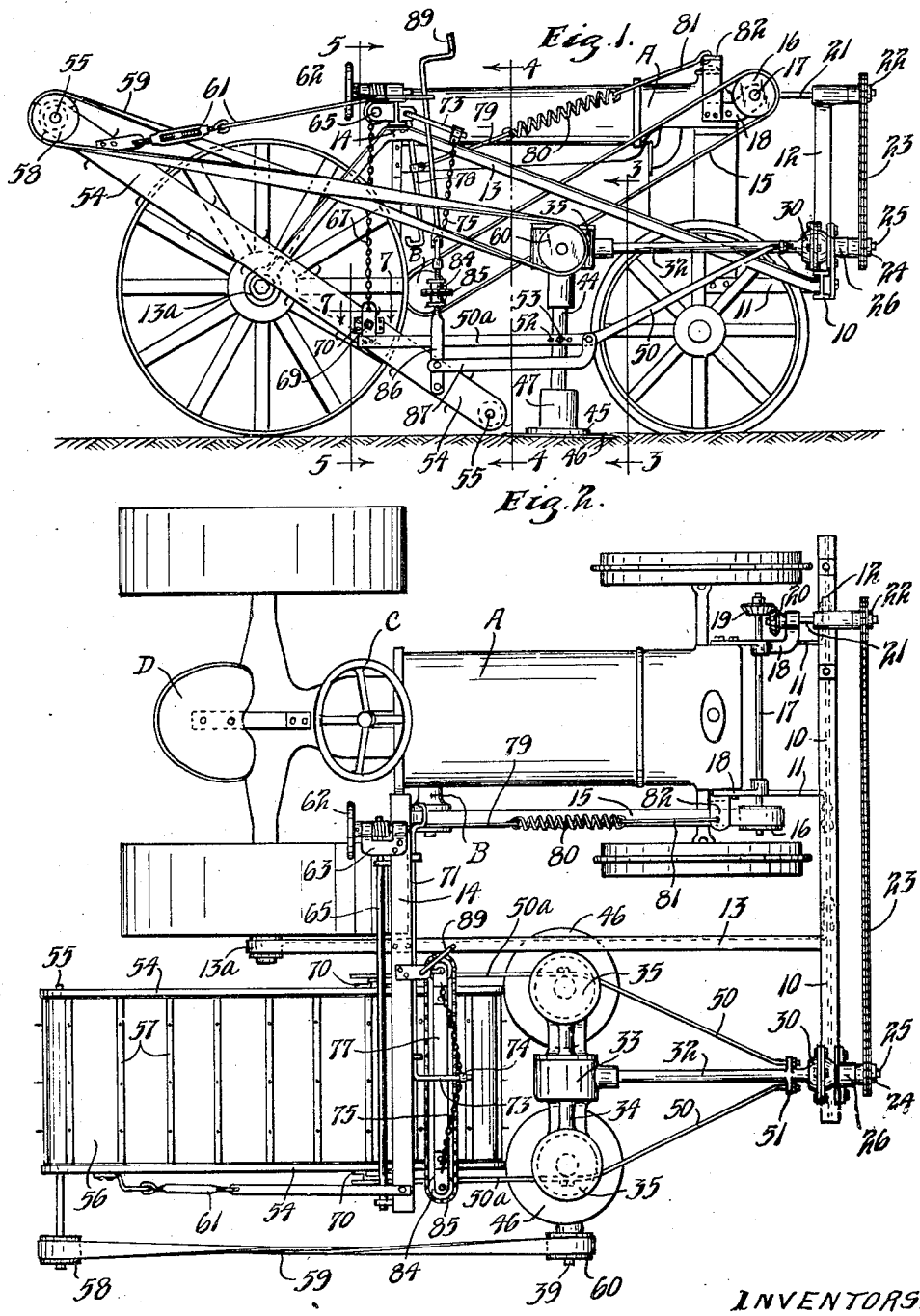

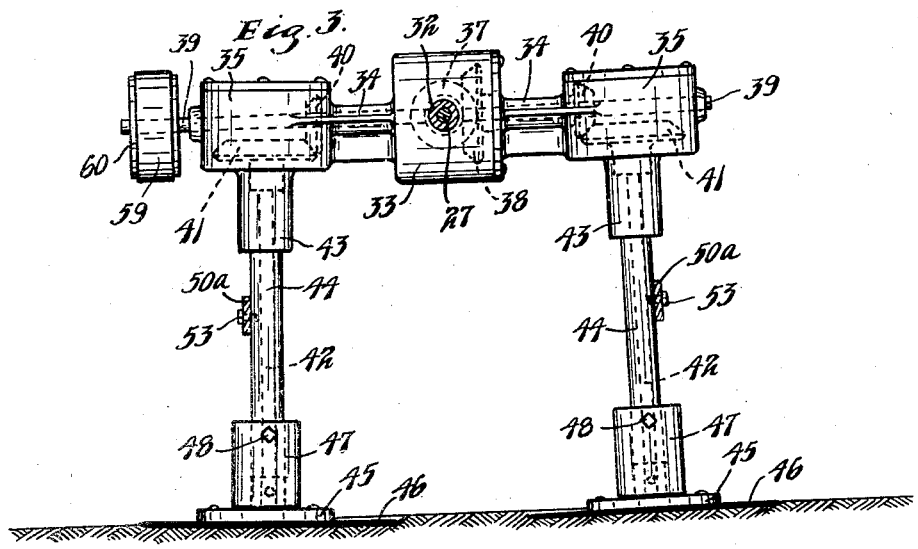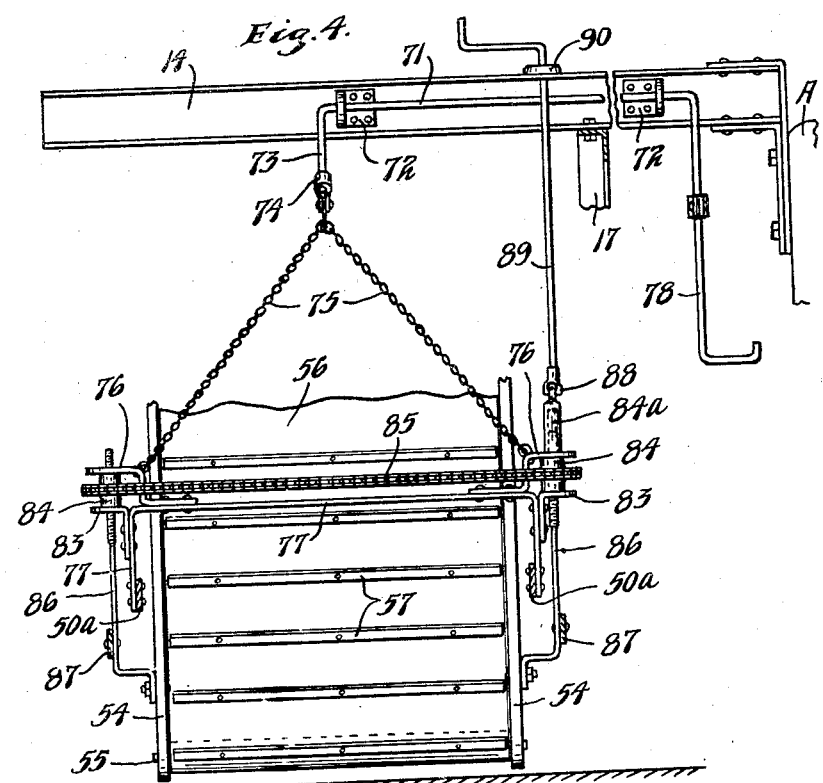

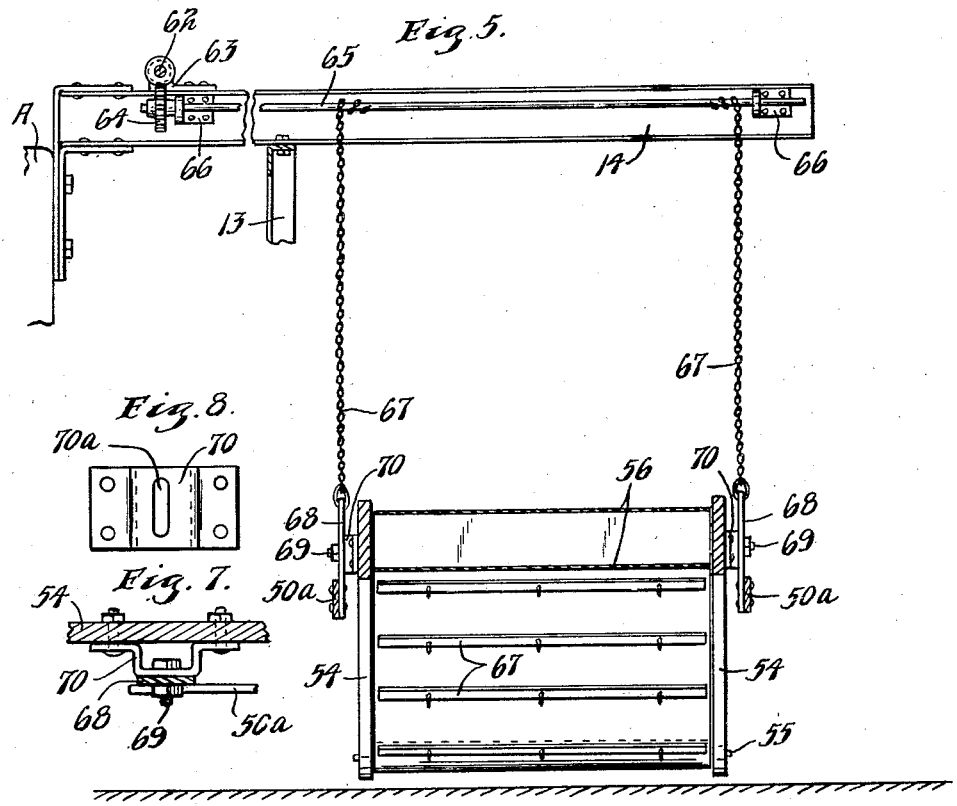
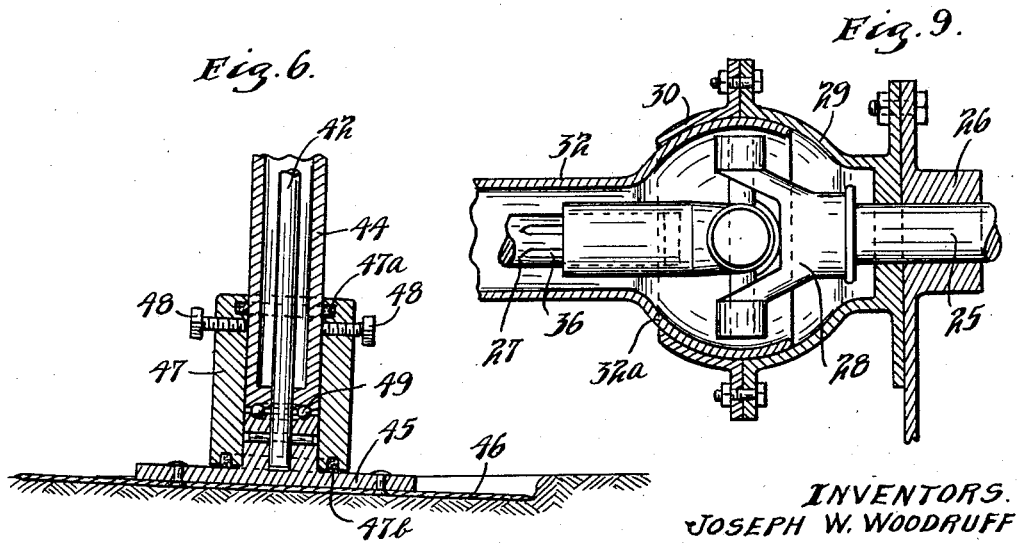

1,894,740

UNITED STATES PATENT OFFICE

AUGUST GROENIG AND JOSEPH W. WOODRUFF, OF RUPERT, IDAHO

MACHINE FOR HARVESTING BEANS AND PEAS

Application filed February 11, 1931. Serial No. 515,040.

This invention has for its object to provide an improved machine for harvesting beans and peas, two rows at a time; and, to this end the invention consists of the novel devices and combinations of devices hereinafter described and pointed out in the claim.

The invention, in its preferred form, is illustrated in the accompanying drawings, with the harvesting devices proper shown supported by and operated from an ordinary gasoline tractor.

In said drawings, like notations refer to like parts throughout the several views; and therein:—

Fig. 1 is a right side elevation of the machine;

Fig. 2 is a plan view of the parts shown in Fig. 1;

Fig. 3 is a sectional elevation on the line 3—3 of Fig. 1, with some of the parts removed, but showing the rotary cutting disks, some of their driving connections and some of the housings for said driving connections, and which housings form part of the drag for the cutters;

Fig. 4 is a sectional elevation on the line 4—4 of Fig. 1, with some of the parts removed, but showing an adjusting device for the lower end of the elevator;

Fig. 5 is a sectional elevation on the line 5—5 of Fig. 1, with some parts removed, but showing the windlass or main adjusting device for the cutters and the elevator, for setting the same in working position and lifting the same clear of the ground;

Fig. 6 is a detail in vertical section showing the relations of one of the rotary cutting disks to its driving shaft and the lower end bearings for the same;

Fig. 7 is a detail in horizontal section on the line 7—7 of Fig. 1;

Fig. 8 is a detail in elevation showing one of the parts of Fig. 7 detached; and Fig. 9 is a vertical section through the universal joint which connects the forward end of the cutter drag to the front cross beam of the harvester frame.

The tractor which carries the harvester frame and supplies power to the movable parts of the harvesting devices may be of any suitable form; but, as roughly outlined in Figs. 1 and 2 of the drawings, the tractor there intended to be represented is of the "Fordson" type. For present purposes, it is sufficient to note the body portion A, the power delivery pulley B, the steering wheel C, and the driver's seat D.

The numeral 10 represents the transverse front beam of the harvester frame shown as a steel or iron I-beam rigidly supported from the body portion A of the tractor by strong brackets 11, as shown in Figs. 1 and 2 of the drawings. This transverse front beam 10 is located a short distance above the axle of the front wheels of the tractor and extends a considerable distance to the right of the tractor, as clearly shown in Fig. 2 of the drawings. This transverse front beam 10 has, near its left end, a bearing standard 12 for a purpose which will later appear. The numeral 13 represents the main longitudinal beam, or what might be called the backbone of the harvester frame, and which is shown as an iron or steel I-beam which is bent upon itself, at about one-third of its length, so that its front and rear portions incline toward each other at an obtuse angle and that the said bend will form a sort of a hump standing at a level considerably above the ends of the beam. The front end of said beam 13 is rigidly secured to the transverse front beam 10 of the harvester frame and its rear end is provided with an eye portion 13a which engages the outer hub of the right hand member of the rear wheels of the tractor, as clearly shown in Figs. 1 and 2. The numeral 14 represents a top cross beam, shown as an I-bar of iron or steel, which has its inner end rigidly secured to the dash casting of the body A of the tractor and is located with its body portion resting on the flattened hump of the backbone beam 13 and is rigidly secured thereto. This top beam 14 is of such a length that it extends to the right for a considerable distance beyond the backbone beam 13, as clearly shown in Fig. 2 of the drawings. The said elements numbered 10 to 14, inclusive, make up the supporting frame of the harvester proper carried from the tractor and projecting outward to the right side thereof.

The power delivery pulley B receives rotary motion from the engine of the tractor; and this pulley B is connected by a belt 15 with a pulley 16 on the right end of a transverse shaft 17 journaled in bearing brackets 18 fixed to and projecting from the forward end of the tractor body A, as best shown in Fig. 2. Said shaft 17 is provided at its left end with a beveled gear 19 which engages with a beveled gear 20 on the inner end of a short shaft 21 which has its inner end journaled in the left hand member of said bearing brackets 18, and has its body portion journaled in the upper end of the bearing standard 12 rising from the front cross beam 10 of the harvester frame. This shaft 21 has, on its outer end a sprocket 22 which is connected by a chain 23 with a sprocket 24 fixed to the forward end of a short shaft 25 journaled in a bearing bracket 26 fixed to the transverse front beam 10 of the harvester frame. The shaft section 25 has its inner end connected to another shaft section 27 by a knuckle joint 28 located in housing sections 29 and 30, of proper form, when connected together, to afford the socket member of a ball and socket joint. The shaft section 27 is provided with a housing 32 which, at its forward end, is of the proper form to afford the ball portion 32a of a ball and socket joint, as shown in Fig. 9 of the drawings. The section 29 of the socket is bolted, or otherwise rigidly secured to a bracket 26 rising from the front cross beam 10 of the harvester frame, and the other section 30 of the said housing is bolted to the section 29 after the ball-shaped head 32a of the housing 32 has been placed in the section 29. This assumes that the section 30 has been strung on the housing 32 in advance of the assembling of the said joint sections. Of course, the section 30 might be made up of two subsections of equal arcuate length and then be bolted together, as well as to the section 29. The part of the knuckle joint 28 carried by the shaft section 25 is rigidly secured thereto; but the part of the said knuckle joint 28 carried by the shaft section 27 is splined to said shaft section 27 as shown at 36, so as to permit the needed limited slippage of those two parts in respect to each other under the angular motion of the housing section 32 and the parts connected therewith.

The housing section 32 extends to a junction with the central member 33 of a gear casing integrally connected with the cross housing 34 having at its outer ends additional gear casings 35, as best shown in Fig. 3. The shaft 27, at its inner end, is provided with a beveled gear 37 which engages with the beveled gear 38 on a cross shaft 39 suitably journaled in the gear casings 33, 34 and 35 and which shaft 39 is provided, on its opposite ends, with beveled pinions 40 oppositely inclined and engaging respectively, one with each of the beveled gears 41 carried by the upper ends of the cutter driving shafts 42 and operating to turn the said shafts toward each other. The said cutter driving upright shafts 42 have their upper ends journaled in housing sections 43 formed integral with and depending from the end gear casings 35. Additional housing sections 44 are secured to and depend from the said housing sections 43, and the lower ends of said housing sections 44 are bridged or closed with the exception of axially located passages for the respective shafts 42 as shown in Fig. 6. The lower ends of the shafts 42 are pinned, or otherwise rigidly secured to the hubs of foot plates 45 to the undersides of which are riveted, or otherwise secured, the rotary cutting disks 46. The numeral 47 represents an open-ended sleeve, the lower end of which receives the hub of one of said foot plates 45, and the upper end portion of which receives the lower end portion of the housing 44 and is removably secured thereto by set screws 48, or other suitable means. Ball bearings 49 are placed between the hubs of said foot plates 45, and the lower ends of the said housings 44, as clearly shown in Fig. 6 of the drawings. The sleeve 47 is provided with a pair of packing gaskets 47a and 47b, the upper of which packs the joint between the sleeve and the housing 44 and the lower of which packs the joint between the lower end of said sleeve and the foot plate 45. In assembling the parts of this joint, the sleeve 47 is slipped upward on the housing section 44 until the shaft 42 is placed in working position with its lower end pinned to the hub of the foot plate 45, and then the sleeve 47 is dropped down into its proper working position, and the set screws 48 screwed inward far enough to clamp the sleeve 47 fast to the housing 44. This form of said joint, shown in Fig. 6 of the drawings, was selected simply for convenience of illustration. In commercial practice, the joint would be of such form that the ball bearings could act in a bath of oil without permitting the oil to waste out at the lower end of the joint and there would be no projections to engage with the plants. If this particular form should be used in practice, the exterior of the sleeve 47 would be provided with counter-sinks for the heads of the set screws 48, and the screws would be of such length that when screwed home their heads would be embedded in said counter-sinks; and small ducts would be provided in the bridges at the lower ends of the housings 44 so that said housings could be loaded with oil through suitable supply inlets and that the oil would then run down onto the ball bearing surfaces.

The rotary cutting disks 46 are so set that, when in working position, their outer edges are about one inch higher than their inner edges and that their rear edges are about one inch higher than their front edges, for the purpose of giving to said disks the necessary suction to hold the same in the ground under the forward travel of the machine. The said disks 46 are preferably made about eighteen inches in diameter. The said required inclinations of said disks 46 are secured, in the illustrated machine, by having the housing sections 44 and the cutter driving shaft sections 42 so disposed that their lower ends are farther apart than their upper ends, as clearly shown in Fig. 3 of the drawings, and so that their upper ends incline forward, as shown in Figs. 1 and 6 of the drawings. It has been found in practice that the driving beveled gears 40 and 41 for the said shafts 42 will operate all right when the said housings 44 and the said shafts 42 are set at the angles just hereinbefore stated to give the desired dip to the inner and rear edges of the cutters 46.

It has just been stated that the said cutting disks 46 are preferably made eighteen inches in diameter, and, from what has hereinbefore been stated about the action of their driving gears, it is obvious that the said rotary cutting disks 46 must turn toward each other. Rows of beans or peas, or similar plants are usually spaced from twenty two to twenty six inches apart. The said rotary cutting disks 46 of this machine are laterally spaced apart twenty six inches from center to center, which brings the same into such positions that they will operate on rows of plants spaced from twenty-two to twenty-six inches apart. Each disk operates on one row of plants, severing the stems from the roots, about one inch below the top of the ground, and, as the disks turn toward each other, they throw the plants inward and rearward to about the center line of the space between the two disks.

Diagonally disposed braces 50 have their upper forward ends secured to lugs 51, near the forward ends of the housing 32, and have their body portions adjustably secured to the housings 44, for the upright shafts 42, as shown in Figs. 1 and 2 of the drawings. As shown in Fig. 1, the said body portions of said braces 50 are provided with several bolt holes 52, through selected ones of which headed tap bolts 53 are passed and made to engage with screw-threaded seats (not shown) in the housings 44. The presence of the closely spaced several holes 52 enable the tap screws 53 to be applied to the proper selected holes to hold the housings 44 in their proper angular adjustment to give the required dip to the forward edges of the cutting disks. The body portions of said braces 50 extend rearward a considerable distance beyond the said holes 52, through which they are attached by tap bolts 53 to the housings 44, thus affording portions 50a, for a purpose which will presently be noted.

The housing portions of the universal joint shown in Fig. 9 of the drawings, taken together with the housings 32, 33, 34, 35 and 44, make up the drag for the rotary cutting disks 46, and, of course, also serve to support and house the driving connections therein contained. In virtue of said universal joint, this drag is angularly adjustable in every direction at its rear end; and hence, the rear end thereof can be raised up and down to bring the cutters into working position, or to lift the same, free from the ground whenever so desired. The means for this purpose will be presently noted.

Directly to the rear of the rotary cutting disks, is located the lower end of an elevator made up of a suitable frame 54 having suitable guide rollers 55 located at its opposite ends. On these rollers 55 is mounted to travel an endless canvas conveyor 56 having toothed slats 57, the teeth of which are so bent that their upper projecting ends are hook-shape as shown in Fig. 1 of the drawings. The upper member of said pair of rollers 55 is provided with a pulley 58 at its right hand projecting end; and this pulley 58 is connected by crossed belt 59 to a pulley 60 fixed to the right hand end of the cross shaft 29 mounted in the gear casings 33, 34 and 35 of the drag, as hitherto noted, and as shown in Figs. 2 and 3 of the drawings. Said driving connections will make the said canvas conveyor 56 and its toothed slats to travel in the proper direction for the purpose intended.

Said elevator frame 54 has its upper end portion anchored by a rod and turn buckle connection 61 to the right hand end of the top cross beam 14 of the harvester frame, as shown in Figs. 1 and 2; and, it is obvious, that thereby the rear end of the elevator is adjustably and pivotally supported from said cross beam 14 of the harvester frame.

The numeral 62 represents the hand wheel and worm shaft of a windlass having its said shaft journaled in a bearing bracket 63 secured to said top cross beam 14 of the frame near its inner end, as shown in Figs. 1, 2 and 5. Said windlass worm shaft engages with the worm gear 64 fixed to the inner end of the main shaft 65 of the windlass, which is mounted in a pair of spaced bearing brackets 66 fixed to the rear profile face of said top cross beam 14, as shown in Fig. 5. To said windlass shaft 65 are fixed the upper ends of a pair of chains 67 which have their lower ends pivotally attached to the upper ends of short vertical arms 68 fixed to and rising from the rear ends of the backwardly extended portions 50a of the drag braces 50, as shown in Figs. 1 and 5. These arms 68 are connected by headed and nutted bolts 69 to slotted guide brackets 70 fixed to the side bars of the elevator frame 54, as shown in Figs. 1, 5, 7 and 8. The slots 70ª in the guide brackets 70 extend in a vertical direction and permit of a limited vertical sliding motion of said arms 68 or bolts 69 relative to the slotted brackets 70 and the elevator frame 54, for a purpose which will later appear.

It has hitherto been noted that the rearward extensions 50ª of the drag braces 50 are connected to the housings 44 of the rotary cutter shafts 42 by the headed tap bolts 53. It must therefore be obvious that by the manipulation of the hand wheel and worm 62 of the windlass, the driver of the machine may raise or lower simultaneously the rotary cutting disks 46 together with the whole rear end of the drag bar and the lower end of the elevator frame 54, and the vertical adjustment thus available is sufficient to enable the driver to lower the rotary cutting disks and the lower end of the elevator into their proper working positions or to lift the said parts high enough, not only to clear the ground, but any obstructions that might be in the path of the machine, and there hold the said parts while the machine is moved to any different position desired, such for example as when the machine is traveling on the road. In other words, the windlass normally supports the rear end of the cutter drag and the lower end of the elevator.

It is desirable, however, to have also an available means for lifting the said rotary cutting disks and the lower end of the elevator far enough above their working positions to clear small obstructions in their paths, such as small stones for example; and, to this end a foot action adjusting device is provided. A shaft 71 is journaled in bearing brackets 72 fixed to the front profile face of the top cross beam 14 of the harvester frame, as shown in Fig. 4, and this shaft 71 has at its inner end a short crank inner arm 73 which carries at its outer end a hanger clip 74 adjustably secured thereon. The clip 74 takes hold of the upper ends of a pair of chains 75, the lower ends of which are secured each to one of a pair of angle iron brackets 76 secured respectively to the opposite ends of a cross bar 77, as shown in Fig. 4 of the drawings. Said cross bar 77 has its end portions turned downward and inward, nearly at right angles to its body portion, thus making said cross bar of U-shape, and the down turned ends of this cross bar 77 are rigidly secured to the rearward extensions 50ª of the drag brace bars 50. At its inner end, said shaft 71 is provided with a downwardly extended treadle crank 78 located within the reach of the driver's foot when sitting on the seat D of the tractor. The said treadle crank 78 is pivotally connected to the lower member 79 of a pair of short rods 79 and 81 which are connected together by a coiled spring 80. The upper rod 81 is anchored to a bracket 82 fixed to the right hand upper end of the tractor body A as shown in Figs. 1 and 2 of the drawings. The said spring 80 is a compression spring tending to pull the rods 79 and 81 toward each other, and, as the upper rod 81 is anchored to the body of the tractor and the lower rod to the treadle crank 78, the said parts and the parts connected to the crank shaft 71 tend to counterpoise the weight from the free end of the drag and the lower end of the elevator; and, hence, whenever the driver sees that an interfering obstruction appears in the path of either of the cutting disks and the lower end of the elevator, he operates the treadle crank 78 and lifts the said parts, with an instantaneous action, far enough to clear the said obstructions. The windlass chains 67 slacken, when this foot lift occurs.

It is also desirable to have some means for giving to the lower end of the elevator frame 54 a limited vertical adjustment without lifting or lowering the rotary cutting disks or the free end of the cutter drag. Such means is illustrated in Figs. 1, 2 and 4 of the drawings. In said Fig. 4, the numerals 83 represent a pair of angle iron brackets rigidly secured to the downturned ends or vertical portions of the cross bars 77 hitherto noted, the outer ends of which brackets 83 are spaced apart from the horizontal portions of the angle iron brackets 76 hitherto noted as being secured to the cross bar 77. Between said brackets 76 and 83 are located the hubs of a pair of sprockets 84 connected by a chain 85. The hubs of said sprockets 84 are screw threaded on their interiors and engage the screw threaded portions of links 86, the lower ends of which links are pivotally secured to the side bars on the elevator frame 54 a short distance above the lower end of said elevator, as shown in Figs. 1 and 4. Said links 86 are also pivotally connected to the rear ends of brace bars 87, the forward ends of which are upturned and are pivotally secured to the drag brace bars 50, at points forward of the housings 44 of the cutter driving shafts 42, as shown in Fig. 1. One of said two sprockets 84 has on its hub a sleeve-like upward extension 84ª, the upper end of which is connected by a knuckle joint 88 with the lower end of a hand crank shaft 89, the upper portion of which is journaled in a bearing 90 fixed to the face of the top cross beam 14 of the frame, as best shown in Fig. 4. The handle portion of this crank shaft 89 is located within the reach of the driver's hand when he is sitting on the seat D of the tractor; and, by turning said crank shaft 89, he can rotate the said nut action sprockets 84 so that they will turn in the proper direction on the screw threaded portions of the links 86 between the fixed brackets 76 and 83 to raise or lower said links and carry therewith the lower end of the elevator far enough to secure the proper setting of that part of the elevator to the cutting disks 46 for the best cooperation of the said parts. This adjustment available from the manipulation of said hand crank 89 is limited by the length of the vertical slots 70ª in the guide brackets 70 secured to the side bars of the elevator frame, as hitherto noted, but it is sufficient for the purpose intended. The slippage available from the relations of the parts of the joint by which the arms 68 are connected to the side bars of the elevator frame 54 enables said limited adjustment of the lower end of the elevator to be made by the manipulation of said hand crank shaft 89 and the connections therefrom without lifting or in any ways disturbing the rotary cutters 46.

The braces 87, applied as hitherto described, serve to keep the lower end of the elevator from swinging forward against the cutter drag.

Special attention is called to the fact that the driving connections from the delivery pulley B of the tractor to the upright shafts 42 which carry the rotary cutting disks 46, at their lower ends, are of such a character that the said cutting disks 46 will be rotated toward each other at a peripheral speed considerably greater than the speed of the forward travel of the machine. Said cutting disks 46 must be so driven, at said faster speed than the travel of the machine, in order to get the proper action from said disks on the plants. Of course, it will be understood that the peripheral edges of said cutting disks 46 must be kept reasonably sharp. All the parts of the harvesting mechanism and of the frame by which said harvesting mechanism is supported from the tractor, have now been specified; and it is thought that the operations of the different parts of the mechanism must be clear from said detailed specification.

However, the general action of the machine may be briefly summarized as follows:—

The engine of the tractor being in action, the tractor and harvester are then made to so travel that the rotary cutting disks 46 will operate respectively one on each of two adjacent rows of the plants to be harvested. Assuming that the said cutting disks have been properly set, they will sever the stems of the plants from the roots thereof, at about one inch below the top of the ground; and as said disks rotate toward each other they will throw the severed plants inward and backward approximately to the cross center line of the space between the two disks, and, thereby deliver the plants onto the lower end of the elevator. The elevator will then receive the said severed plants and the endless conveyor thereof will carry the plants upward and deliver the same over the upper end of the elevator either onto the ground or into any suitable receptacle carried with or hitched to the machine. Of course, a cart or wagon might be hitched to the harvesting machine, as a trailer with the body thereof in position to receive the plants from the elevator, or a threshing cylinder might be carried by the same tractor in position to receive the plants and thresh out the seeds, or the receptacle used might be provided with an automatic dumping device for collecting the plants into bunches and then dropping the bunches onto the ground.

By the actual usage of a roughly built experimental machine, the practicability and efficiency of the harvesting mechanism herein disclosed has been actually demonstrated in working tests of that experimental machine.

The general advantages of this improved harvesting machine should be obvious. Inasmuch as the cutting disks rotate at fairly high speeds, turn toward each other and have the angular disposition in respect to each other and the horizontal plane hereinbefore pointed out, it follows that the stems of the plants will be severed from their roots by said cutters with a shearing action; and, it further follows that the severed plants will be thrown inward and backward on approximately the cross center line of the space between the disks and onto the lower end of the elevator so quickly that there is no chance for the successive stems to accumulate and clog either the disks or the elevator. For similar reasons, the said cutting disks do not crush the pods or vines of the plants; and, hence the beans, peas or other seed bearing plants may be first permitted to get fully ripe before harvesting the same. For the same reasons above noted, the severed plants are not covered either with loose dirt, stones or other trash.

This machine can be used to harvest all kinds of seed bearing plants that are grown in suitably spaced rows; and, of course, the spacing of the rotary cutting disks may be varied on different sizes of the machine.

It will, of course, be understood that many of the details of this harvesting machine may be varied without departing from the spirit of the invention herein disclosed and claimed.

What is claimed is:—

A machine for harvesting beans and peas, comprising the combination with a supporting frame movable over the ground, of a pair of spaced rotary cutting disks carried by said frame in position to sever the plants from their roots, means for rotating said disks toward each other, an elevator having its lower end in position to receive the severed plants from said rotary cutting disks, and means for adjusting the lower end of said elevator relative to said disks.

In testimony whereof we affix our signatures.

AUGUST GROENIG.
JOSEPH W. WOODRUFF.